United States Patent
Daniel et al.

(10) Patent No.: US 10,769,292 B2
(45) Date of Patent: Sep. 8, 2020

(54) HIERARCHICAL TEMPORAL MEMORY FOR EXPENDABLE ACCESS CONTROL

(71) Applicant: British Telecommunications Public Limited Company, London (GB)

(72) Inventors: Joshua Daniel, London (GB); Xiaofeng Du, London (GB); Gery Ducatel, London (GB)

(73) Assignee: British Telecommunications Public Limited Company, London (GB)

( * ) Notice: Subject to any disclaimer, the term of this patent is extended or adjusted under 35 U.S.C. 154(b) by 258 days.

(21) Appl. No.: 15/939,650

(22) Filed: Mar. 29, 2018

(65) Prior Publication Data
US 2018/0285585 A1 Oct. 4, 2018

(30) Foreign Application Priority Data

Mar. 30, 2017 (EP) .................................. 17164006

(51) Int. Cl.
*G06F 21/62* (2013.01)
*G06N 20/00* (2019.01)
*G06Q 20/06* (2012.01)

(52) U.S. Cl.
CPC .......... *G06F 21/6218* (2013.01); *G06F 21/62* (2013.01); *G06N 20/00* (2019.01); *G06Q 20/065* (2013.01)

(58) Field of Classification Search
CPC ..... G06F 21/6218; G06F 21/62; G06N 20/00; H04L 2209/38; H04L 9/3239; H04L 9/3297
See application file for complete search history.

(56) References Cited

U.S. PATENT DOCUMENTS

| | | |
|---|---|---|
| 6,192,405 B1 | 2/2001 | Bunnell |
| 7,716,739 B1 | 5/2010 | McCorkendale |
| 7,797,748 B2 | 9/2010 | Zheng et al. |
| 7,870,153 B2 | 1/2011 | Croft et al. |
| 8,271,974 B2 | 9/2012 | Mazhar et al. |
| 8,375,437 B2 | 2/2013 | Linsley et al. |
| 8,479,294 B1 | 7/2013 | Li et al. |
| 8,516,241 B2 | 8/2013 | Chang et al. |

(Continued)

FOREIGN PATENT DOCUMENTS

| | | |
|---|---|---|
| EP | 2381363 A2 | 10/2011 |
| EP | 2101599 B1 | 9/2013 |

(Continued)

OTHER PUBLICATIONS

Es-Samaali, H., Outchakoucht, A. and Leroy, J.P., 2017. A blockchain-based access control for big data. International Journal of Computer Networks and Communications Security, 5(7), p. 137. (Year: 2017).*

(Continued)

*Primary Examiner* — Robert B Leung
(74) *Attorney, Agent, or Firm* — Patterson Thuente Pedersen, P.A.

(57) ABSTRACT

Computer implemented methods for access control for a restricted resource in a computer system and related methods train a hierarchical temporal memory and use cryptocurrency allocations and blockchain records to determine whether resource consumers are authorized or unauthorized to access the restricted resource.

4 Claims, 5 Drawing Sheets

(56) References Cited

U.S. PATENT DOCUMENTS

| | | |
|---|---|---|
| 8,739,155 B2 | 5/2014 | Hehir et al. |
| 9,009,825 B1 | 4/2015 | Chang et al. |
| 9,183,378 B2 | 11/2015 | Banerjee et al. |
| 9,235,813 B1 | 1/2016 | Qian et al. |
| 9,466,051 B1 | 10/2016 | Roth et al. |
| 9,495,668 B1 | 11/2016 | Juels et al. |
| 9,807,106 B2 | 10/2017 | Daniel et al. |
| 2002/0100035 A1 | 7/2002 | Kenyon et al. |
| 2002/0120725 A1 | 8/2002 | Dacosta et al. |
| 2003/0084349 A1 | 5/2003 | Friedrichs et al. |
| 2003/0204644 A1 | 10/2003 | Vincent |
| 2004/0015977 A1 | 1/2004 | Benke et al. |
| 2004/0268296 A1 | 12/2004 | Kayam et al. |
| 2005/0091269 A1 | 4/2005 | Gerber et al. |
| 2006/0282660 A1 | 12/2006 | Varghese et al. |
| 2007/0192267 A1* | 8/2007 | Hawkins ........... G06N 3/04 706/52 |
| 2009/0254499 A1 | 10/2009 | Deyo |
| 2009/0313193 A1* | 12/2009 | Hawkins ........... G06N 3/049 706/13 |
| 2010/0011029 A1 | 1/2010 | Niemelae |
| 2010/0262873 A1 | 10/2010 | Chang et al. |
| 2011/0197070 A1 | 8/2011 | Mizrah |
| 2011/0265154 A1 | 10/2011 | Furlan et al. |
| 2012/0053925 A1 | 3/2012 | Geffin et al. |
| 2012/0215727 A1 | 8/2012 | Malik et al. |
| 2012/0246290 A1 | 9/2012 | Kagan |
| 2012/0284794 A1 | 11/2012 | Trent et al. |
| 2012/0304007 A1 | 11/2012 | Hanks et al. |
| 2012/0311526 A1 | 12/2012 | Deanna et al. |
| 2013/0006949 A1 | 1/2013 | Essawi et al. |
| 2014/0164251 A1 | 6/2014 | Loh |
| 2014/0215490 A1 | 7/2014 | Mathur et al. |
| 2014/0298011 A1 | 10/2014 | Ganesan |
| 2014/0344015 A1 | 11/2014 | Puértolas-Montañés et al. |
| 2014/0358825 A1 | 12/2014 | Phillipps et al. |
| 2014/0372346 A1 | 12/2014 | Phillipps et al. |
| 2015/0120567 A1 | 4/2015 | Van Rooyen et al. |
| 2015/0127595 A1* | 5/2015 | Hawkins, II ........... G06N 7/005 706/46 |
| 2015/0134606 A1 | 5/2015 | Magdon-Ismail et al. |
| 2015/0227741 A1 | 8/2015 | Permeh et al. |
| 2015/0271318 A1 | 9/2015 | Antos et al. |
| 2015/0332283 A1 | 11/2015 | Witchey |
| 2015/0332395 A1 | 11/2015 | Walker et al. |
| 2015/0356523 A1 | 12/2015 | Madden |
| 2015/0356555 A1 | 12/2015 | Pennanen et al. |
| 2015/0363876 A1 | 12/2015 | Ronca et al. |
| 2015/0379423 A1 | 12/2015 | Dirac et al. |
| 2016/0048771 A1 | 2/2016 | Chen et al. |
| 2016/0057041 A1 | 2/2016 | Gupta et al. |
| 2016/0078367 A1 | 3/2016 | Adjaoute |
| 2016/0086175 A1 | 3/2016 | Finlow-Bates et al. |
| 2016/0098730 A1 | 4/2016 | Feeney |
| 2016/0112397 A1* | 4/2016 | Mankovskii ........... H04L 63/105 726/6 |
| 2016/0164884 A1 | 6/2016 | Sriram et al. |
| 2016/0221186 A1 | 8/2016 | Perrone |
| 2016/0260095 A1 | 9/2016 | Ford |
| 2016/0283920 A1 | 9/2016 | Fisher et al. |
| 2016/0299938 A1* | 10/2016 | Malhotra ........... G06F 16/2237 |
| 2017/0063886 A1 | 3/2017 | Muddu et al. |
| 2017/0109735 A1 | 4/2017 | Sheng et al. |
| 2017/0124534 A1 | 5/2017 | Savolainen et al. |
| 2017/0134412 A1* | 5/2017 | Cheng ........... H04L 67/2842 |
| 2017/0279774 A1 | 9/2017 | Booz et al. |
| 2017/0279818 A1 | 9/2017 | Milazzo et al. |
| 2017/0286136 A1 | 10/2017 | Dimitrakos et al. |
| 2018/0025166 A1 | 1/2018 | Daniel et al. |
| 2018/0144114 A1 | 5/2018 | Fiske et al. |
| 2018/0225466 A1 | 8/2018 | Ducatel et al. |
| 2018/0225469 A1 | 8/2018 | Daniel et al. |
| 2018/0225611 A1 | 8/2018 | Daniel et al. |
| 2018/0232526 A1 | 8/2018 | Reid et al. |
| 2019/0036895 A1 | 1/2019 | Irvine |
| 2019/0050541 A1 | 2/2019 | Wright et al. |
| 2019/0139136 A1 | 5/2019 | Molinari et al. |

FOREIGN PATENT DOCUMENTS

| | | | |
|---|---|---|---|
| EP | 2816469 A1 | 12/2014 | |
| EP | 3101599 A2 | 12/2016 | |
| GB | 2540976 A | 2/2017 | |
| WO | WO-0184285 A2 | 11/2001 | |
| WO | WO-2012117253 A1 | 9/2012 | |
| WO | WO-2013172750 A1 | 11/2013 | |
| WO | WO-2015128612 A1 | 9/2015 | |
| WO | WO-2015179020 A2 | 11/2015 | |
| WO | WO-2016034496 A1 | 3/2016 | |
| WO | WO-2016077127 A1 | 5/2016 | |
| WO | WO-2016191639 A1 | 12/2016 | |
| WO | WO-2017021153 A1 * | 2/2017 | ............ G06F 21/62 |
| WO | WO-2017054985 A1 | 4/2017 | |
| WO | WO-2017167547 A1 | 10/2017 | |
| WO | WO-2017167548 A1 | 10/2017 | |
| WO | WO-2017167549 A1 | 10/2017 | |
| WO | WO-2017167550 A1 | 10/2017 | |
| WO | WO-2018178026 | 10/2018 | |
| WO | WO-2018178034 | 10/2018 | |
| WO | WO-2018178035 | 10/2018 | |
| WO | WO-2018206374 | 11/2018 | |
| WO | WO-2018206405 | 11/2018 | |
| WO | WO-2018206406 | 11/2018 | |
| WO | WO-2018206407 | 11/2018 | |
| WO | WO-2018206408 | 11/2018 | |
| WO | WO2018228950 | 12/2018 | |
| WO | WO2018228951 | 12/2018 | |
| WO | WO2018228952 | 12/2018 | |
| WO | WO2018228973 | 12/2018 | |
| WO | WO2018228974 | 12/2018 | |

OTHER PUBLICATIONS

Azaria, A., Ekblaw, A., Vieira, T. and Lippman, A., Aug. 2016. Medrec: Using blockchain for medical data access and permission management. In 2016 2nd International Conference on Open and Big Data (OBD) (pp. 25-30). IEEE. (Year: 2016).*

Hawkins et al., in "On Intelligence, How a New Understanding of the Brain Will Lead to the Creation of Truly Intelligent Machines" (2004, Times Books, ISBN 0-8050-7456-2); 174 pages.

Numenta in "Hierarchical Temporal Memory including HTM Cortical Learning Algorithms"; Version 0.2.1, (Numenta, Sep. 12, 2011); 68 pages.

Numenta in "Biological and Machine Intelligence (BAMI) —A living book that documents Hierarchical Temporal Memory (HTM)" (Numenta, Inc., Mar. 8, 2017) (retrieved Mar. 28, 2018) available from https://numenta.com/assets/pdf/biological-and-machine-intelligence/BAMI-Complete.pdf ; 69 pages.

Billaudelle, et al.; "Porting HTM Models to the Heidelberg Neuromorphic Computing Platform" May 2015) available from Cornell University Library (citation arXiv:1505.02142) and https://arxiv.org/pdf/1505.02142.pdf (retrieved Mar. 28, 2018); Kirchhoff-Institute for Physics, Heidelberg, Germany, Numenta, Inc., Redwood City, CA; 9 pages.

Purdy, Scott; "Encoding Data for HTM Systems" (Feb. 2016) available from Cornell University Library (citation arXiv:1602.05925) and https://arxiv.org/ftp/arxiv/papers/1602/1602.05925.pdf; Numenta, Inc., Redwood City, California, USA; (retrieved Mar. 28, 2018); 11 pages.

Ahmad et al., "How Do Neurons Operate on Sparse Distributed Representations? A Mathematical Theory of Sparsity, Neurons and Active Dendrites" (Jan. 2016) available from Cornell University Library (citation arXiv:1601.00720) and https://arxiv.org/ftp/arxiv/papers/1601/1601.00720.pdf (retrieved Mar. 28, 2018); Numenta, Inc., Redwood City, CA, USA; 23 pages.

Ahmad et al., "Real-Time Anomaly Detection for Streaming Analytics" (Jul. 8, 2016) available from Cornell University Library (cita-

(56) References Cited

OTHER PUBLICATIONS tion arXiv:1607.02480) and https://arxiv.org/pdf/1607.02480.pdf (retrieved Mar. 28, 2018); Numenta, Inc., Redwood City, CA, USA; 10 pages.

Lavin et al., "Evaluating Real-time Anomaly Detection Algorithms—the Numenta Anomaly Benchmark" (Oct. 9, 2015) available from Cornell University Library (citation arXiv:1510.03336) and https://arxiv.org/ftp/arxiv/papers/1510/1510.03336.pdf (retrieved Mar. 28, 2018); Numenta, Inc., Redwood City, CA, USA; 8 pages.

Cui et al., "The HTM Spatial Pooler: A Neocortical Algorithm for Online Sparse Distributed Coding" (Feb. 3, 2017) available from Cold Spring Harbor Laboratory bioRxiv (citation doi.org/10.1101/085035) and https://www.biorxiv.org/content/biorxiv/early/2017/02/16/085035.full.pdf (retrieved Mar. 28, 2018); Numenta, Inc., Redwood City, CA, USA; 16 pages.

Cui et al., "Continuous Online Sequence Learning with an Unsupervised Neural Network Model" (Nov. 2016) published in Published in Neural Computation (Nov. 2016, vol. 28. No. 11) and available from https://www.mitpressjournals.org/doi/pdf/10.1162/NECO_a_00893 (retrieved Mar. 28, 2018); Numenta, Inc., Redwood City, CA, USA; 31 pages.

Hawkins et al., "Why Neurons Have Thousands of Synapses, A Theory of Sequence Memory in Neocortex" (Mar. 30, 2016) published in Frontiers in Neural Circuits (10 (2016) 1-13, doi:10.3389/fncir.2016.00023) and available from https://www.frontiersin.org/articles/10.3389/fncir.2016.00023/full (retrieved Mar. 28, 2018); Numenta, Inc., Redwood City, CA, USA; 13 pages.

Numenta; "Sparse Distributed Representations" (Numenta, available from https://numenta.com/assets/pdf/biological-and-machine-intelligence/BaMI-SDR.pdf and accessed on Mar. 29, 2017) (retrieved Mar. 28, 2018); 15 pages.

Olshausen et al.; "Sparse Coding with an Overcomplete Basis Set: A Strategy Employed by V1?" (Olshausen, B.A., Field, D.J., 1997, Vision Research, 37:3311-3325) http://www.chaos.gwdg.de/~michael/CNS_course_2004/papers_max/OlshausenField1997.pdf; revised Dec. 24, 1996; (retrieved Mar. 28, 2018); 15 pages.

Andreas M. Antonopoulos; Mastering Bitcoin. Unlocking Digital Crypto-Currencies. Early Release Raw & Unedited; Dec. 2014 First Edition; ISBN: 978-1-449-37404-4; https://unglueit-files.s3.amazonaws.com/ebf/05db7df4f31840f0a873d6ea14dcc28d.pdf (O'Reilly Media, Apr. 2014); 282 pages.

Dr. Gavin Wood; "Ethereum: A Secure Decentralised Generalised Transaction Ledger" EIP-150 Revision; (2014); 32 pages.

Meni Rosenfeld "Overview of Colored Coins" (Dec. 4, 2012) https://bravenewcoin.com/assets/Whitepapers/Overview-of-Colored-Coins.pdf 13 pages.

Assia, Y. et al, "Colored Coins Whitepaper" (2015) and available at docs.google.com/document/d/1AnkPcVZTCMLIzw4DvsW6M8Q2JC01IzrTLuoWu2z1BE) 23 pages.

Ahmad et al., "Properties of Sparse Distributed Representations and their Application to Hierarchical Temporal Memory" (Mar. 24, 2015) available from Cornell University Library (citation arXiv:1503.07469) and https://arxiv.org/ftp/arxiv/papers/1503/1503.07469.pdf (retrieved Mar. 28, 2018); Numenta, Redwood City, CA, USA; 18 pages.

Combined Search and Examination Report for Great Britain Application No. 1707377.6, dated Nov. 9, 2017, 9 pages.

Combined Search and Examination Report for Great Britain Application No. 1707379.2, dated Nov. 9, 2017, 9 pages.

International Search Report and Written Opinion for Application No. PCT/EP2018/061405, dated Jun. 20, 2018, 12 pages.

International Search Report and Written Opinion for Application No. PCT/EP2018/061406, dated Jun. 20, 2018, 13 pages.

"A Next-Generation Smart Contract and Decentralized Application Platform" Ethereum White Paper, 2016, retrieved from https://github.com/ethereum/wiki/wiki/White-Paper on Nov. 13, 2018, 40 pages.

Adler M., "Threat Intelligence Visibility—the way forward," BT, 2015, available from www.globalservices.bt.com/uk/en/products/assure threat_ monitoring, 8 pages.

Anonymous, "Can BitCoin be a better DRM? BitcoinBeginners," retrieved from https://www.reddit.com/r/BitcoinBeginners/commentsll y5yh8/can bitcoin be_a_better_drm, Feb. 17, 2014, 3 pages.

Anonymous, "Colored Coins—Bitcoin Wiki," Retrieved from https://en.bitcoin.it/w/index.php?title=ColoredCoins&oldid=57259, Jul. 7, 2015, 6 pages.

Anonymous, "Who Will Protect Users From Ethereum Based Malware? : Ethereum," Mar. 28, 2016, Retrieved from https://www.reddit.com/r/ethereum/comments/4ccfaa/who_will_protect_users_from_ethereum_based_malware/?st=itbp2q49&sh=d8cc4355 on Nov. 13, 2018, 3 pages.

Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.

Bakshi, et al., "Securing Cloud from DDOS Attacks Using Intrusion Detection System in Virtual Machine," IEEE, 2010, 5 pages.

Bellifemine, et al., "JADE: A Software Framework for Developing Multi-Agent Applications. Lessons Learned," Elsevier, 2007, 12 pages.

Benders J.F., "Partitioning Procedures for Solving Mixed Variables Programming Problems," 1962, vol. 4, pp. 238-252.

Biryukov A., et al., "R&D in Smart Contracts, Cryptocurrency and Blockchain," University of Luxembourg, Jan. 19, 2016, XP055306767, Retrieved from http://wwwfr.uni.lu/snt/news_events/speaker_s_presentations on Sep. 29, 2016, pp. 51 pages.

Bitcoin Developer Guide, "Transactions," Retrieved from https://github.com/bitcoin-dot-org.bitcoin.org.bitcoin.org/blob/64e4c549bc5fae480e2f400c052686fd34c8fae/_includes/devdoc/guide_transactions.md, 2017, 10 pages.

Bonneau J., et al., "Research Perspectives and Challenges for Bitcoin and Cryptocurrencies," International Association for Cryptologic Research, Mar. 19, 2015, 18 pages.

Chaisiri, "Optimization of Resource Provisioning Cost in Cloud Computing," IEEE Transactions on Services Computing, Apr.-Jun. 2012, vol. 5 (2), 14 pages.

Combined search and Examination Report under Sections 17 and 18(3) for Great Britain Application No. 1707376.8, dated Nov. 9, 2017, 8 pages.

Combined search and Examination Report under Sections 17 and 18(3) for Great Britain Application No. 1707378.4, dated Nov. 9, 2017, 11 pages.

Cruz J.P., et al., "The Bitcoin Network as Platform for TransOrganizational Attribute Authentication," WEB 2015, The Third International Conference on Building and Exploring Web Based Environments, XP055239598, Rome, Italy, 2015, 7 pages.

Czepluch J.S., et al., "The Use of Block Chain Technology in Different Application Domains," XP055242451, retrieved from http://http://www.lollike.org/bachelor.pdf, May 20, 2015, 109 pages.

Extended European Search Report for Application No. 17170020.6, dated Nov. 10, 2017, 8 pages.

Extended European Search Report for Application No. 17170022.2, dated Nov. 16, 2017, 8 pages.

Extended European Search Report for Application No. 17170024.8, dated Nov. 10, 2017, 10 pages.

Extended European Search Report for Application No. EP15179440.1, dated Feb. 10, 2016, 6 pages.

Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.

Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/grushacj_paper.pdf, Jun. 2014, 44 pages.

International Preliminary Report on Patentability for Application No. PCT/EP2015/069670, dated Mar. 16, 2017, 7 pages.

International Preliminary Report on Patentability for Application No. PCT/EP2015/069673, dated Mar. 16, 2017, 9 pages.

(56) References Cited

OTHER PUBLICATIONS

International Preliminary Report on Patentability for Application No. PCT/EP2016/052865, dated Aug. 24, 2017, 9 pages.
International Preliminary Report on Patentability for Application No. PCT/EP2016/067308, dated Feb. 15, 2018, 7 pages.
International Preliminary Report on Patentability for Application No. PCT/EP2016/067309, dated Feb. 15, 2018, 7 pages.
International Preliminary Report on Patentability for Application No. PCT/EP2016/067310, dated Feb. 15, 2018, 8 pages.
International Preliminary Report on Patentability for Application No. PCT/EP2017/055081, dated Oct. 11, 2018, 9 pages.
International Preliminary Report on Patentability for Application No. PCT/EP2017/055082, dated Oct. 11, 2018, 8 pages.
International Preliminary Report on Patentability for Application No. PCT/EP2017/055090, dated Oct. 11, 2018, 10 pages.
International Preliminary Report on Patentability for Application No. PCT/EP2017/055091, dated Oct. 11, 2018, 9 pages.
International Preliminary Report on Patentability for Application No. PCT/EP2018/057674, dated Oct. 10, 2019, 8 pages.
International Preliminary Report on Patentability for Application No. PCT/EP2018/057685, dated Oct. 10, 2019, 9 pages.
International Preliminary Report on Patentability for Application No. PCT/EP2018/057686, dated Oct. 10, 2019, 8 pages.
International Preliminary Report on Patentability for Application No. PCT/EP2018/061405, dated Nov. 21, 2019, 7 pages.
International Preliminary Report on Patentability for Application No. PCT/EP2018/061406, dated Nov. 21, 2019, 8 pages.
International Preliminary Report on Patentability for Application No. PCT/EP2018/061407, dated Nov. 21, 2019, 8 pages.
International Preliminary Report on Patentability for Application No. PCT/EP2018/061408, dated Nov. 21, 2019, 10 pages.
International Preliminary Report on Patentability for Application No. PCT/EP2017/055094, dated Oct. 11, 2018, 8 pages.
International Search Report and Written Opinion for Application No. PCT/EP2015/069670, dated Nov. 11, 2015, 8 pages.
International Search Report and Written Opinion for Application No. PCT/EP2015/069673, dated Nov. 12, 2015, 10 pages.
International Search Report and Written Opinion for Application No. PCT/EP2016/052865, dated Mar. 17, 2016, 11 pages.
International Search Report and Written Opinion for Application No. PCT/EP2016/067309, dated Nov. 3, 2016, 9 pages.
International Search Report and Written Opinion for Application No. PCT/EP2016/067310, dated Sep. 22, 2016, 9 pages.
International Search Report and Written Opinion for Application No. PCT/EP2017/055081, dated Apr. 7, 2017, 11 pages.
International Search Report and Written Opinion for Application No. PCT/EP2017/055082, dated Apr. 26, 2017, 9 pages.
International Search Report and Written Opinion for Application No. PCT/EP2017/055090, dated Jun. 14, 2017, 12 pages.
International Search Report and Written Opinion for Application No. PCT/EP2017/055091, dated Apr. 11, 2017, 11 pages.
International Search Report and Written Opinion for Application No. PCT/EP2017/055094, dated May 15, 2017, 10 pages.
International Search Report and Written Opinion for Application No. PCT/EP2017/055095, dated Apr. 11, 2017, 10 pages.
International Search Report and Written Opinion for Application No. PCT/EP2018/057674, dated May 2, 2018, 10 pages.
International Search Report and Written Opinion for Application No. PCT/EP2018/057685, dated Jun. 1, 2018, 11 pages.
International Search Report and Written Opinion for Application No. PCT/EP2018/057686, dated Apr. 20, 2018, 10 pages.
International Search Report and Written Opinion for Application No. PCT/EP2018/061261, dated Jun. 20, 2018, 13 pages.
International Search Report and Written Opinion for Application No. PCT/EP2018/061407, dated Jun. 20, 2018, 13 pages.
International Search Report and Written Opinion for Application No. PCT/EP2018/061408, dated Jun. 20, 2018, 15 pages.
International Search Report and Written Opinion for PCT Application No. PCT/EP2016/067308, dated Sep. 21, 2016, 8 pages.
International Preliminary Report on Patentability for Application No. PCT/EP2017/055095, dated Oct. 11, 2018, 8 pages.
Jin, et al., "A Guest-Transparent File Integrity Monitoring Method in Virtualization Environment," Elsevier, 2010, 11 pages.
Miller A., "The State-of-the-Art of Smart Contracts," FinTech R&D Innovation Conference, Luxemburg, Jan. 19, 2016, Retrieved from URL: http://wwwfr.uni.lu/snt/news_events/speaker_s_presentations on Sep. 29, 2016, 29 pages.
Patel H, "A block chain based decentralized exchange," International Association for Cryptologic Research, XP061017563, Dec. 18, 2014, vol. 20141225:065012, 9 pages.
Plohmann D., et al., "Case study of the Miner Botnet," 4TH International Conference on Cyber Conflict, Jun. 5, 2012, pp. 345-360.
Search Report dated Nov. 8, 2017 for Great Britain Application No. GB1707381.8, 7 pages.
Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.
Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.
Tschorsch F., et al., "Bitcoin and Beyond: A Technical Survey on Decentralized Digital Currencies," International Association for Cryptologic Research, May 15, 2015, pp. 1-37.
Wang Z., "The Applications of Deep Learning on Traffic Identification," 2012, Advances in Neural Information Processing Systems, 10 pages.
Wikipedia, "Blockchain (database)—Wikipedia," Nov. 29, 2015, retrieved from https://en.wikipedia.org/w/index.php?title=Block_chain_(database)&oldid=692921608 on Nov. 13, 2018, pp. 1-5.
Wu J., et al., "Hierarchical Temporal Memory Method for Time-Series-Based Anomaly Detection," 2016, IEEE, 16th International Conference Data Mining Workshops, XP033055893, Dec. 12, 2016, pp. 1167-1172.
Zambonelli, et al., "Agent-Oriented Software Engineering for Internet Applications," Coordination of Internet Agents: Models, Technologies, and Applications, Chapter—13, Springer, 2000, 21 pages.
Zupan B., et al., "Machine Learning by Function Decomposition," ICML 1997, Retrieved from https://citeseerxist.psu.edu/viewdoc/download?doi=10.1.1.29.4455&rep=repl&type=pdf on Oct. 17, 2017, 9 pages.
Application and Filing Receipt for U.S. Appl. No. 16/086,058, filed Sep. 18, 2018, Inventor(s): Daniel et al.
Application and Filing Receipt for U.S. Appl. No. 16/086,074, filed Sep. 18, 2018, Inventor(s): Daniel et al.
Application and Filing Receipt for U.S. Appl. No. 16/086,087, filed Sep. 18, 2018, Inventor(s): Smith et al.
Application and Filing Receipt for U.S. Appl. No. 16/086,109, filed Sep. 18, 2018, Inventor(s): Daniel et al.
U.S. Appl. No. 16/498,827, filed Sep. 27, 2019, Inventor(s): Daniel et al.
Application and Filing Receipt for U.S. Appl. No. 16/498,880, filed Sep. 27, 2019, Inventor(s): Daniel et al.
U.S. Appl. No. 16/498,932, filed Sep. 27, 2019, Inventor(s): Daniel et al.
Application and Filing Receipt for U.S. Appl. No. 16/611,682, filed Nov. 7, 2019, Inventor(s): Ghanea-Hercock.
Application and Filing Receipt for U.S. Appl. No. 16/611,686, filed Nov. 7, 2019, Inventor(s): Ghanea-Hercock.
Application and Filing Receipt for U.S. Appl. No. 16/611,694, filed Nov. 7, 2019, Inventor(s): Ghanea-Hercock.
Application and Filing Receipt for U.S. Appl. No. 16/611,701, filed Nov. 7, 2019, Inventor(s): Ghanea-Hercock.
Application and Filing Receipt for U.S. Appl. No. 16/611,707, filed Nov. 7, 2019, Inventor(s): Ghanea-Hercock.
Application and Filing Receipt for U.S. Appl. No. 15/223,261, filed Jul. 29, 2016, Inventor(s): Daniel et al.
Application and Filing Receipt for U.S. Appl. No. 15/548,654, filed Aug. 3, 2017, Inventor(s): Daniel et al.
Application and Filing Receipt for U.S. Appl. No. 15/749,289, filed Jan. 31, 2018, Inventor(s): Ducatel et al.

(56) References Cited

OTHER PUBLICATIONS

Application and Filing Receipt for U.S. Appl. No. 15/749,338, filed Jan. 31, 2018, Inventor(s): Daniel et al.
Application and Filing Receipt for U.S. Appl. No. 15/749,391, filed Jan. 31, 2018, Inventor(s): Daniel et al.

* cited by examiner

HIERARCHICAL TEMPORAL MEMORY FOR EXPENDABLE ACCESS CONTROL

CROSS-REFERENCE TO RELATED APPLICATION

The present application claims priority to EP Application No. 17164006.3 filed Mar. 30, 2017, which is hereby incorporated by reference in its entirety.

TECHNICAL FIELD

The present disclosure relates to access control for a restricted resource in a computer system.

BACKGROUND

Access control for computer systems, services and resources is based on a defined set of access rights for a user, consumer or class of user or consumer. Notably, users or consumers can include other computer systems, software components or automated entities that make use of, or consume, services and/or resources. These access rights can be constituted as access control rules for a user or class that must be defined to determine permitted and/or non-permitted actions by a user such as access to resources and/or services.

Defining access control rules requires considerable effort to ensure all aspects of access control and behavior management are considered. Thus, rules can be defined on a per-resource or service basis, a per-user or class basis, and per-permission or user/consumer right basis. The multi-dimensional considerations in defining these rules therefore presents a considerable burden that it would be advantageous to mitigate.

SUMMARY

The present disclosure accordingly provides a computer implemented method for access control for a restricted resource in a computer system, the method comprising: receiving a first set of records for the computer system, each record detailing an occurrence in the computer system during a training time period when the resource is accessed in an approved manner; generating a sparse distributed representation of the set of records to form a training set for a hierarchical temporal memory (HTM); training the HTM based on the training set in order that the trained HTM provides a model of the operation of the computer system during the training time period; receiving a request to access the resource by a resource consumer; allocating a predetermined quantity of cryptocurrency to the consumer, the allocation being recorded by a blockchain data structure accessible by a network, the blockchain storing digitally signed records validated by network connected miner software components; receiving a second set of records for the computer system, each record detailing an occurrence in the computer system during an operating time period for the computer system in use by the consumer of the resource; generating a sparse distributed representation of the second set of records to form an input set for the trained HTM; executing the trained HTM based on the input set to determine a degree of recognition of the records of the input set; and responsive to a determination that a degree of recognition of one or more records of the input set is below a threshold degree, generating a blockchain transaction to expend at least a portion of the cryptocurrency allocated to the user; responsive to a determination that a quantity of cryptocurrency allocated to the user is below a threshold quantity, identifying the consumer as unauthorized to access the resource.

In some embodiments the method further comprises precluding access to the computer system and/or resource in response to an identification that the consumer is unauthorized.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Embodiments of the present disclosure will now be described, by way of example only, with reference to the accompanying drawings, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 1:
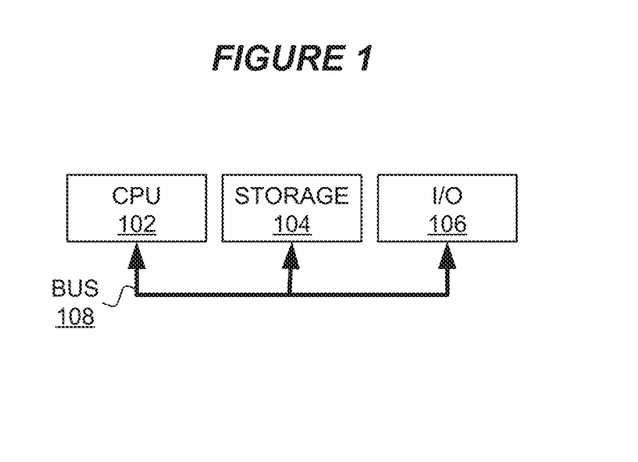
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
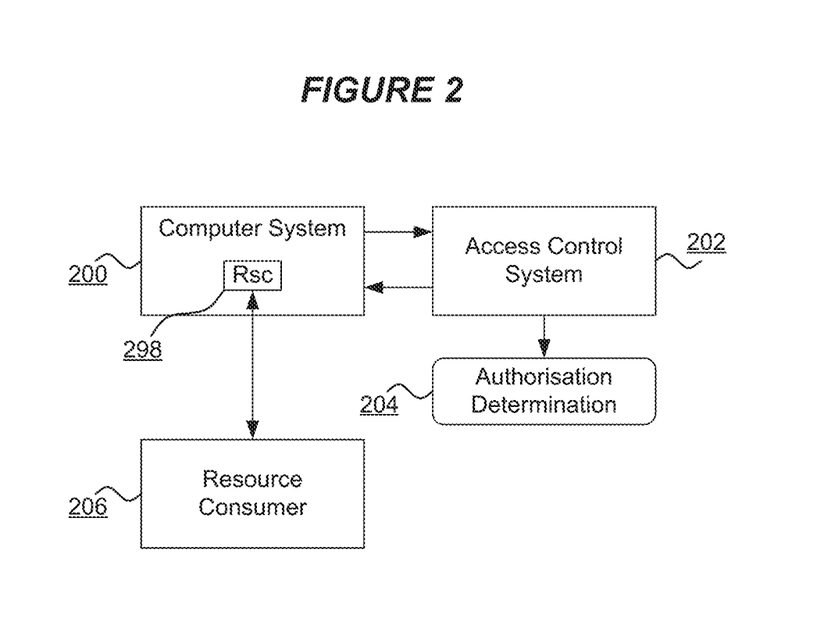
FIG. 2 is a component diagram of an illustrative arrangement in accordance with embodiments of the present disclosure.

FIG. 2 is a component diagram of an illustrative arrangement in accordance with embodiments of the present invention. A computer system 200 is provided as a physical, virtual or combination system having a restricted resource 298. The resource 298 can be a logical, physical, hardware, software, firmware or combination component whether real or virtualized to which access can be requested and of which use can be made by a resource consumer 206. The restricted resource 298 could conceivably include, inter alia: computing resource such as processor, storage, interface, network, peripheral, bus or other computing resource; a software resource such as an application, service, function, subroutine, operation or the like; a data store including a database, directory structure or directory, file store, memory or the like; or other resources as will be apparent to those skilled in the art.

The resource consumer 206 can be one or more users of the computer system 200 or, additionally or alternatively, other computer systems or computing resources could access the resource 298. For example, a software service executing in a second computer system may interface with, communicate with or otherwise operate with the computer system 200 to access the resource 298 to assist in its delivery of its service. Thus, in use, the resource consumer 206 accesses the computer system 200 and consumes the resource 298.

It will be appreciated that the computer system 200 can be a complete computer system such as illustrated in FIG. 1 or can be a part of a computer system 200 such as a software component or application executing on or with a computer system, a service provided at least in part by a computer system, or a network of multiple computer systems in communication.

FIG. 1 further includes an access control system 202 arranged to access the computer system 200 to determinate a state of authorization of the resource consumer 206 consuming the restricted resource 298. The access control system 202 thus generates an authorization determination 204 for the resource consumer's 206 access to the restricted resource 298. Notably, the authorization determination 204 will relate to the use of the resource 298 by the consumer 206 for a defined period of time (since an authorized use by the consumer 206 could become subsequently unauthorized). Accordingly, in some embodiments the access control system 202 operates on a continuous basis to determine a state of authorization of the consumer 206.

Figure 3:
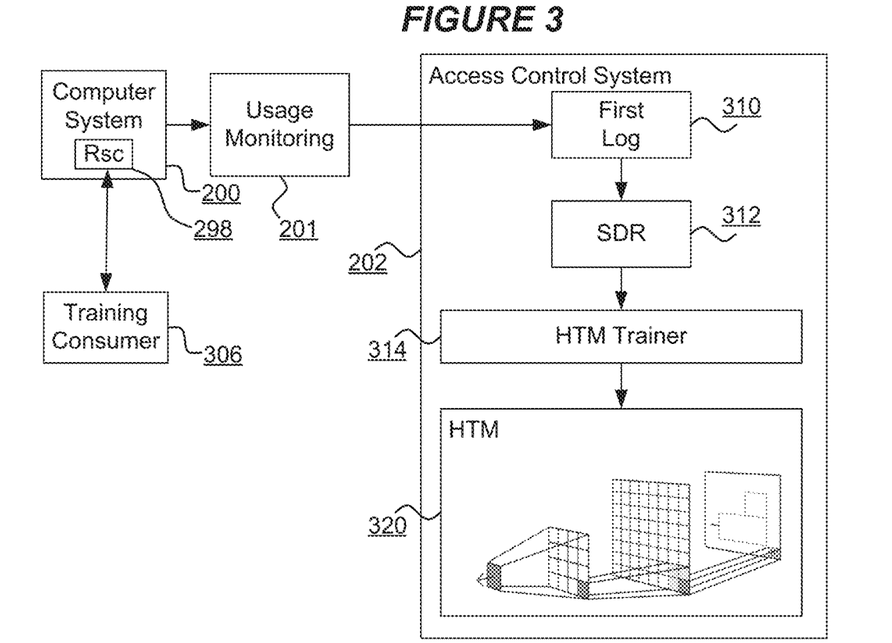
FIG. 3 is a component diagram illustrating the operation of an access control system to train a hierarchical temporal memory in accordance with embodiments of the present disclosure.

FIG. 3 is a component diagram illustrating the operation of an access control system 202 to train a hierarchical temporal memory (HTM) 320 in accordance with embodiments of the present disclosure. A training consumer 306 is provided which is a consumer adapted to access and/or use the restricted resource 298 in a training mode of embodiments of the present disclosure. The training mode is a mode in which a model of authorized use of the resource 298 is generated by the access control system 202 as described below. Thus, the training consumer 306 operates to access and/or use the restricted resource 298 only in a manner that is authorized. The training consumer 306 operates to access and/or use the restricted resource 298 of the computer system 200. A usage monitoring component 201 is configured to monitor the computer system 200 during use of and/or access to the restricted resource 298. For example, the usage monitoring component 201 can monitor consumption of the resource 298, one or more states of the resource 298, operations performed by, on or to the resource 298, and the like, while the resource 298 is used by the training consumer 306. To illustrate, if the resource 298 is a storage resource such as a virtual disk store, the usage monitoring component 201 observes, notes, or receives information on the operation of the computer system 200 including read operations, write operations, an amount of data stored, data content, times of operations, frequencies of operations, an identity of the consumer 306 requesting, invoking or making the operations, and other such usage information as will be apparent to those skilled in the art. For example, the usage monitoring component 201 can be installed on the computer system 200, or in communication with the computer system 200, such that it is able to monitor the computer system 200 and the use of or access to the restricted resource 298 such as by way of operating system or configuration interfaces or services.

The access control system 202 receives a first log 310 from the usage monitoring component 201 in respect of usage by the consumer 206 of the restricted resource 298. The first log 310 is a set of records for the computer system 200 in relation to the use of the resource 298 by the training consumer 306 for a defined period of time—known as a training time period. During the training time period that the restricted resource 298 is accessed/used only by the training consumer 306 (or, in some embodiments, multiple training consumers each operating only in accordance with authorized access/use of the resource 298). Thus, the records in the first log 310 relate to operations in the computer system 200 while the restricted resource 298 is used and/or accessed by the training consumer 306.

The access control system 202 uses the records in the first log 310 to constitute training data inputs for training a HTM 320. The HTM 320 is a machine learning construct based on principles first described by Jeff Hawkins in "On Intelligence" (2004, Times Books, ISBN 0-8050-7456-2) and described in detail by Numenta in "Hierarchical Temporal Memory including HTM Cortical Learning Algorithms" (Numenta, 12 Sep. 2011). The principles of, implementation of and operation of HTM 320 are beyond the scope of this description and are nonetheless available to the skilled person through existing publications including the papers and books below, each and/or all of which are usable by a skilled person to implement the HTM 320 and other associated features for embodiments of the present disclosure:

"Biological and Machine Intelligence (BAMI)—A living book that documents Hierarchical Temporal Memory (HTM)" (Numenta, Inc., Mar. 8, 2017) (retrieved Mar. 29, 2017) available from numenta.com/assets/pdf/biological-and-machine-intelligence/BAMI-Complete.pdf "Porting HTM Models to the Heidelberg Neuromorphic Computing Platform" (Billaudelle, S. & Ahmad, S., May 2015) available from Cornell University Library (citation arXiv:1505.02142) and arxiv.org/abs/1505.02142

"Encoding Data for HTM Systems" (Purdy, S., February 2016) available from Cornell University Library (citation arXiv:1602.05925) and arxiv.org/abs/1602.05925

"Properties of Sparse Distributed Representations and their Application To Hierarchical Temporal Memory"

(Ahmad, S. & Hawkins, J., March 2015) available from Cornell University Library (citation arXiv:1503.07469) and arxiv.org/abs/1503.07469

"How Do Neurons Operate on Sparse Distributed Representations? A Mathematical Theory of Sparsity, Neurons and Active Dendrites" (Ahmad, S. & Hawkins, J., January 2016) available from Cornell University Library (citation arXiv:1601.00720) and arxiv.org/abs/1601.00720

"Real-Time Anomaly Detection for Streaming Analytics" (Ahmad, S. & Purdy, S., July 2016) available from Cornell University Library (citation arXiv:1607.02480) and arxiv.org/abs/1607.02480

"Evaluating Real-time Anomaly Detection Algorithms—the Numenta Anomaly Benchmark" (Lavin, A. & Ahmad, S., October 2015) available from Cornell University Library (citation arXiv:1510.03336) and arxiv.org/abs/1510.03336

"The HTM Spatial Pooler: A Neocortical Algorithm for Online Sparse Distributed Coding" (Cui, Y., Ahmad, S. & Hawkins, J., February 2017) available from Cold Spring Harbor Laboratory bioRxiv (citation doi.org/10.1101/085035) and biorxiv.org/content/biorxiv/early/2017/02/16/085035.full.pdf "Continuous Online Sequence Learning with an Unsupervised Neural Network Model" (Cui, Y., Ahmad, S. & Hawkins, K., November 2016) published in Published in Neural Computation (November 2016, Vol 28. No. 11) and available from numenta.com/papers/continuous-online-sequence-learning-with-an-unsupervised-neural-network-model/

"Why Neurons Have Thousands of Synapses, A Theory of Sequence Memory in Neocortex" (Hawkins, J. & Ahmad, S., March 2016) published in Frontiers in Neural Circuits (10 (2016) 1-13, doi:10.3389/fncir.2016.00023) and available from numenta.com/papers/why-neurons-have-thousands-of-synapses-theory-of-sequence-memory-in-neocortex/

At a very high level, in one embodiment, the HTM 320 is implementable logically as a hierarchy of functional nodes. The hierarchy of nodes in the HTM 320 is suitable for identifying coincidences in a temporal sequence of input patterns received at an input layer in the hierarchy, with interconnections between the layers permitting such identifications to take place also at each other level in the hierarchy. In addition to an identification of coincidences by nodes in the HTM 320, temporal relationships between coincidences can also be identified. Thus, in a purely exemplary arrangement, a first set of similar patterns occurring before a second set of similar patterns can be resolved to a coincidence (of the first set) with a temporal relationship to a coincidence (of the second set). The coincidences and temporal relations learned at each of many levels in the hierarchical HTM 320 provide for subsequent recognition, by the HTM 320, of a conforming temporal sequence of input patterns and non-conformant sequences. Thus, the HTM 320 can be said to operate in: a learning mode of operation in which coincidences and relationships between coincidences are learned by adaptation of the HTM 320; and an inference mode of operation in which the HTM 320 is executed (by which it is meant that the HTM 320 is applied) to process one or more inputs to determine a degree of recognition of the inputs by the HTM 320 based on what has been learned by the HTM 320. Recognition can be based on a determination, by nodes in the HTM 320, of a set of probabilities that an input belongs to one or more known or recognized coincidences in the trained HTM 320, and probabilities that inputs represent a recognized temporal group of coincidences.

When applied in embodiments of the present disclosure, the HTM 320 has two key features: firstly, the HTM 320 is trained based on the first log 310 to represent a model of the operation of the computer system 200 during authorized use of the restricted resource 298 by the training consumer 306; and secondly the HTM 320 can determine whether subsequent data sets are recognizable to the HTM 320 and thus bear similarity to the operation of the computer system 200 during authorized use.

While the HTM 320 has been described, by way of overview, structurally here, it will be appreciated that its implementation can be a logical representation or approximation of such a structure including a mathematical implementation employing, for example, linear algebra and/or parallel processing means for implementation.

The HTM 320 is trained by a HTM trainer 314 which is a hardware, software, firmware or combination component adapted to undertake the training of the HTM 320. It will be appreciated, on the basis of the above referenced papers and books, that the HTM 320 preferably operates on the basis of a sparse distributed representation (SDR) 312 of data. For example, an SDR can be a binary representation of data comprised of multiple bits in which only a small percentage of the bits are active (i.e. binary 1). The bits in these representations have semantic meaning and meanings are distributed across the bits. SDR is described in "Sparse Distributed Representations" (Numenta, available from github.com/numenta/nupic/wiki/Sparse-Distributed-Representations and accessed on 29 Mar. 2017). Further, the principles underlying SDR are also described in "Sparse coding with an overcomplete basis set: A strategy employed by V1?" (Olshausen, B. A., Field, D. J., 1997, Vision Research, 37:3311-3325). Accordingly, the records in the first log 310 are initially encoded to a SDR by a suitable encoder. Notably, the encoder is configured to set bits in a SDR 312 for a record based on a semantic meaning of the bits and thus the encoder is specifically configured to encode each record in to a SDR 312 based on semantic meaning of some aspect of the record including, for example, one or more of: a content of the record; characteristics of the record such as its length, origin, when it was received, how it was created, what created it etc.; what the record means, what it indicates, what consequence may ensue as a result of an occurrence recorded by the record etc.; and other aspects as will be apparent to those skilled in the art.

Thus, in use, the access control system 202 trains the HTM 320 using SDR representation 312 of records received in the first log 310 for the computer system 200 in use during authorized access/use of the restricted resource 298 by the training consumer 306. Accordingly, following training, the HTM 320 can be said to constitute a model or record of the operation of the computer system 200 during the training time period for which the first log 310 was received. This model is subsequently used to detect an anomalous operation of the computer system 200 vis-à-vis a set of authorized operations as will be described with respect to FIG. 4.

Figure 4:
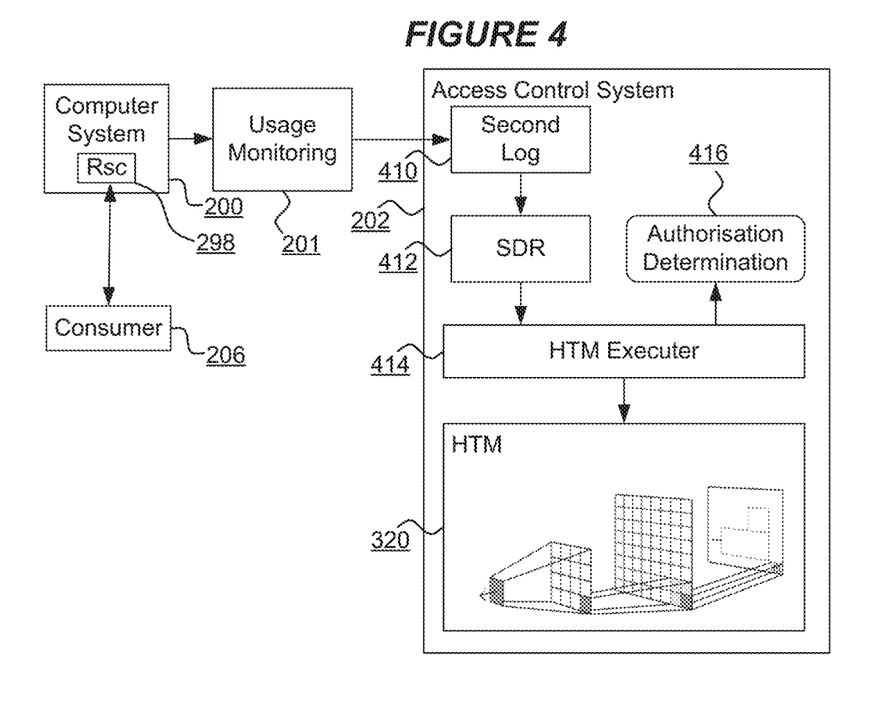
FIG. 4 is a component diagram illustrating the operation of an access control system to determine authorization of a consumer's use of a restricted resource in accordance with embodiments of the present disclosure.

FIG. 4 is a component diagram illustrating the operation of an access control system 202 to determine authorization of a consumer's 206 use of a restricted resource 298 in accordance with embodiments of the present disclosure. The consumer 206 in FIG. 4 is a consumer the authorization of which is not known before time—thus the arrangement of FIG. 4 is a normal operational arrangement of the computer system 200 in which the resource 298 is consumed by a consumer 206. The consumer's 206 use of the computer system 200 and access or use of the restricted resource 298 is monitored by the usage monitoring component 201 by monitoring occurrences in the computer system 200 during an operational time period (or operating time period). The operational time period is defined as distinct to the training time period such that during the operational time period the consumer's 206 authorization to access and/or use the resource 298 in one or more ways is not known and is to be determined.

Thus, the access control system 202 receives a second log 410 of records from the usage monitoring component 201 relating to the operational time period. Subsequently, an SDR 412 of the records of the second log is generated by an encoder substantially as previously described with respect to the first log 310. A HTM executer 414 then executes the HTM 320 (now trained by way of the arrangement of FIG. 3) in an inference or recognition mode of operation. In this mode of operation, the HTM 320 determines a degree of recognition of each SDR data item input to it based on its learned model of the use of the computer system 200 during the training time period. Based on this degree of recognition the HTM 320 also identifies anomalies as SDR inputs that are not recognized by the trained HTM 320.

The HTM 320, modeling the computer system 200 during the training time period then authorized use and/or access of the resource 298 was made by the training consumer 306, will indicate a strong degree of recognition of SDR for records of the second log 410 arising from authorized use of the resource 298 by the consumer 206 in the operational time period. If, however, anomalies are detected by the HTM 320 such that records from the second log 410 are not recognized by the HTM 320, such anomalies indicate a use, by the consumer 206, of the resource 298 that is not consistent with the learned authorized use. An anomaly can be identified by the HTM 320 based on a threshold degree of similarity of SDR 416 for second log 410 records. Thus, where anomalies are identified by the HTM 320 then unauthorized use of the resource 298 by the consumer 206 is determined. Accordingly, the HTM executer 414 is arranged to generate an authorization determination 416 for the use of the resource 298 by the consumer 206 based on the detection of anomalies by the HTM 320.

In some embodiments, the access control system 202 is configured to respond to an authorization determination 416 that the consumer's 206 use and/or access of resource 298 is unauthorized. For example, access to the resource 298 by the consumer 206 can be precluded, or a flag, error or warning can be generated.

Figure 5:
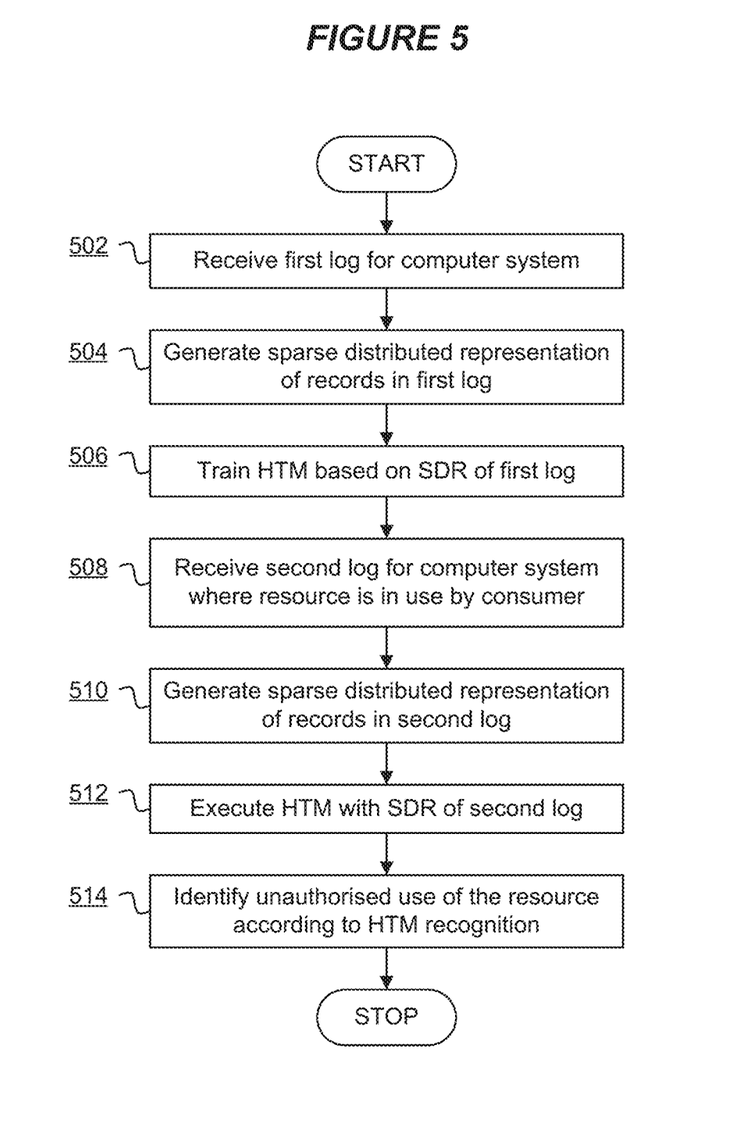
FIG. 5 is a flowchart of a method for access control for a restricted resource in accordance with embodiments of the present disclosure.

FIG. 5 is a flowchart of a method for access control for a restricted resource 298 in accordance with embodiments of the present disclosure. At 502, the access control system 202 receives the first log 310 as a first set of records for the operation of the computer system 200. Each record in the log details an occurrence in the computer system 200 during a training time period when the restricted resource 298 is accessed in an approved manner by the training consumer 306. At 504 an SDR 312 is generated for each of the records in the first log to form a training set for the HTM 320. At 506 the HTM 320 is trained based on the training set such that the trained HTM 320 provides a model of the operation of the computer system during the training time period. At 508, the access control system 202 receives a second set of records for the computer system 200 as a second log 410. Each record in the second log 410 details an occurrence in the computer system 200 during an operational time period for the computer system 200 in use by a consumer 206 of the resource. At 510, an SDR is generated for each of the records in the second log 410 to form an input set for the trained HTM 320. At 512, the trained HTM 320 is executed based on the input set to determine a degree of recognition of the records of the input set by the HTM 320. At 514, the access control system 202 identifies unauthorized use of the resource 298 by the consumer 206 based on a degree of recognition by the HTM 320, where a degree of recognition below a predetermined threshold identifies an anomaly that indicates unauthorized use by the consumer 206.

The access control system 202 in some embodiments of the present disclosure further address a need to provide expendable access control such that access to the restricted resource 298 is permitted while compliant with a trained HTM 320 (i.e. no anomalies detected by the HTM 320) yet access has associated a metric that is expended by deviations from the model of the HTM 320 (i.e. when anomalies are detected). It a simplest implementation, expendable access to a restricted resource can be based on a measure of an amount, frequency or time of access such that expenditure/depletion of the amount, frequency or time ultimately leads to access preclusion. In some environments there is a requirement for more flexible access control such that access to restricted resources in a computer system are generally constrained to a model access profile such as is learned by the HTM 320, but there is also a tolerance for access or use of the resource outside that model profile. For example, the consumption of network, storage and/or processing resource in a virtualized computing environment can be limited to particular resources being consumed in particular ways at a particular rate except that there is a degree of tolerance for access to other resources, or resources in other ways, or at other rates, to a point. Such tolerance can permit resource consumers to handle infrequent, short-lived and/or irregular surges in demand, for example. Yet such tolerant access control must still provide the rigors of strong enforcement when a defined limit to the tolerance is met or exceeded.

Embodiments of the present disclosure employ the HTM 320 model of operation of the computer system 200 during a training time period to detect conformance with learned access control/authorization rules. Resource consumer 206 is also allocated a degree of tolerance by way of an amount of cryptocurrency resource for depletion in the event of deviations from authorized access/use. Thus, when a deviation from the HTM 320 model is detected as an anomaly (non-recognition) by the HTM 320, transactions can be generated to a centralized blockchain to expend the cryptocurrency allocation. This mechanism for depleting tolerance ensures rigorous enforcement of access control since the expenditure is determinate by way of the blockchain which is mutually assured across a distributed blockchain network. When the cryptocurrency is expended, any subsequent anomaly detected by the HTM 320 indicating unauthorized use of the resource 298 can be met with responsive action such as precluding access to the resource 298 by the consumer 206.

Figure 6:
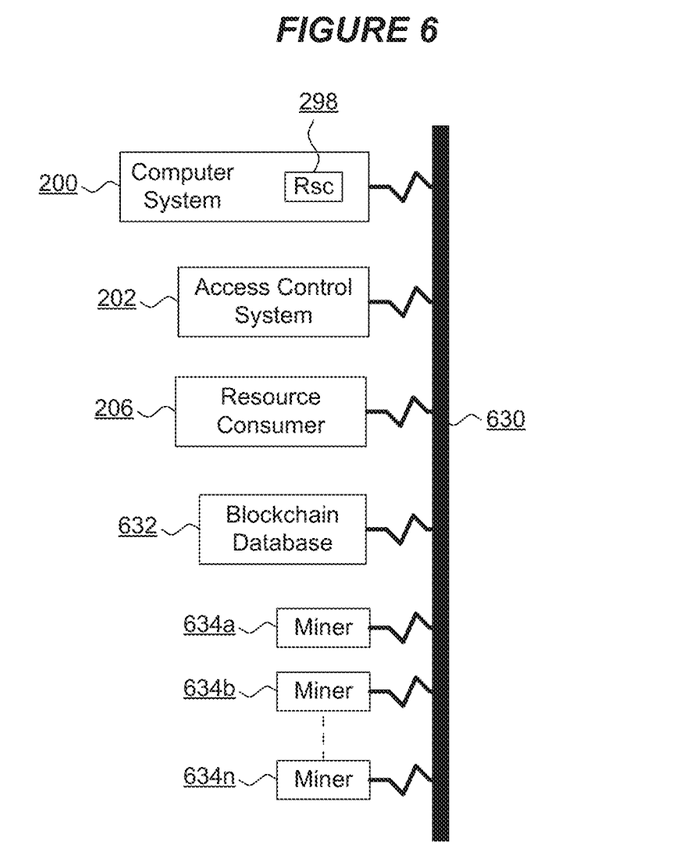
FIG. 6 is a component diagram illustrating an arrangement including a blockchain database communicatively connected to an access control system and a computer system for use in an access control method in accordance with embodiments of the present disclosure.

FIG. 6 is a component diagram illustrating an arrangement including a blockchain database 632 communicatively connected to an access control system 202 and a computer system 200 for use in an access control method in accordance with embodiments of the present disclosure. The computer system 200, restricted resource 298, access control system 202 and resource consumer 206 are substantially as hereinbefore described and will not be repeated here. Additionally there is provided a blockchain database 632 accessible to the access control system 202 and the resource consumer 206 via, for example, a computer network 630 such as a wired or wireless network. While the computer system 200 is also illustrated connected to the same network 630 as the blockchain 632, it will be appreciated that communication there between is not necessarily required and so the computer system 200 may communicate with the access control system 202 and/or the resource consumer 206 via a secondary, different and/or alternate communication means such as a second network.

The blockchain database 632 is a sequential transactional database or data structure that may be distributed and is communicatively connected to the network 630. Sequential transactional databases are well known in the field of cryptocurrencies and are documented, for example, in "Mastering Bitcoin. Unlocking Digital Crypto-Currencies." (Andreas M. Antonopoulos, O'Reilly Media, April 2014). For convenience, the database is herein referred to as blockchain 632 though other suitable databases, data structures or mechanisms possessing the characteristics of a sequential transactional database can be treated similarly. The blockchain 632 provides a distributed chain of block data structures accessed by a network of nodes known as a network of miner software components or miners 634. Each block in the blockchain 632 includes one or more record data structures associated with entities interacting with the blockchain 632. Such entities can include software components or clients for which data is stored in the blockchain 632. The association between a record in the blockchain 632 and its corresponding entity is validated by a digital signature based on a public/private key pair of the entity. In one embodiment, the blockchain 632 is a BitCoin blockchain and the blockchain 632 includes a Merkle tree of hash or digest values for transactions included in each block to arrive at a hash value for the block, which is itself combined with a hash value for a preceding block to generate a chain of blocks (i.e. a blockchain). A new block of transactions is added to the blockchain 632 by miner components 634 in the miner network. Typically, miner components 634 are software components though conceivably miner components 634 could be implemented in hardware, firmware or a combination of software, hardware and/or firmware. Miners 634 are communicatively connected to sources of transactions and access or copy the blockchain 632. A miner 634 undertakes validation of a substantive content of a transaction (such as criteria and/or executable code included therein) and adds a block of new transactions to the blockchain 632. In one embodiment, miners 634 add blocks to the blockchain 632 when a challenge is satisfied—known as a proof-of-work—such as a challenge involving a combination hash or digest for a prospective new block and a preceding block in the blockchain 632 and some challenge criterion. Thus miners 634 in the miner network may each generate prospective new blocks for addition to the blockchain 632. Where a miner 634 satisfies or solves the challenge and validates the transactions in a prospective new block such new block is added to the blockchain 632. Accordingly, the blockchain 632 provides a distributed mechanism for reliably verifying a data entity such as an entity constituting or representing the potential to consume a resource.

While the detailed operation of blockchains and the function of miners 634 in the miner network is beyond the scope of this specification, the manner in which the blockchain 632 and network of miners 634 operate is intended to ensure that only valid transactions are added within blocks to the blockchain 632 in a manner that is persistent within the blockchain 632. Transactions added erroneously or maliciously should not be verifiable by other miners 634 in the network and should not persist in the blockchain 632. This attribute of blockchains 632 is exploited by applications of blockchains 632 and miner networks such as cryptocurrency systems in which currency amounts are expendable in a reliable, auditable, verifiable way without repudiation and transactions involving currency amounts can take place between unrelated and/or untrusted entities. For example, blockchains 632 are employed to provide certainty that a value of cryptocurrency is spent only once and double spending does not occur (that is spending the same cryptocurrency twice).

In accordance with embodiments of the present disclosure, a new or derived cryptocurrency is defined as a quantity of tradable units of value and recorded in the blockchain 632. In some embodiments the quantity of cryptocurrency is recorded in association with the access control system 202 such as by association with a record for the access control system 202 in the blockchain 632. Such a record can be a blockchain account or contract. In some embodiments the cryptocurrency is a bespoke cryptocurrency generated specifically for the purposes of access control. Alternatively, the cryptocurrency is an existing cryptocurrency for which some quantity of cryptocurrency is adapted for access control.

For example, one blockchain-based environment suitable for the implementation of embodiments of the present disclosure is the Ethereum environment. The paper "Ethereum: A Secure Decentralised Generalised Transaction Ledger" (Wood, Ethereum, 2014) (hereinafter Ethereum) provides a formal definition of a generalized transaction based state machine using a blockchain as a decentralized value-transfer system. In an Ethereum embodiment the cryptocurrency is defined as a new unit of tradeable value by an Ethereum account having executable code for handling expenditure of the currency.

In an alternative embodiment, blockchain 632 is a BitCoin blockchain and a derivative of BitCoin cryptocurrency is employed, such as by marking units of BitCoin for association with the access control system 202. For example, Coloredcoins can be used to create a dedicated cryptocurrency that can be validated by the miners 632 (see, for example, "Overview of Colored Coins" (Meni Rosenfeld, Dec. 4, 2012) and "Colored Coins Whitepaper" (Assia, Y. et al, 2015) and available at www.docs.google.com.

In one embodiment, the cryptocurrency is defined by the access control system 202.

In use, the access control system 202 initially trains the HTM 320 as previously described with respect to FIG. 3 using a training consumer 306 accessing the restricted resource 298 in an authorized way. Subsequently, the access control system 202 receives a request for access by the consumer 206 to the restricted resource 298. The request may originate from the consumer 206, from the computer system 200, from the restricted resource itself 298, or from some separate entity tasked with managing restricted resource access/use requests such as an authentication or control system or server. The access control system 202 may optionally apply an access control check in response to the request—such as an authentication or authorization check—before allocating a quantity of cryptocurrency to the consumer 206. The allocation of cryptocurrency to the consumer 206 is recorded in the blockchain 632 by way of a transaction in the blockchain 632, affected and verified by the network of miners 634.

Subsequently, the access control system 202 operates for the operational time period in which the consumer 206 accesses/uses the resource 298 as described above with respect to FIG. 4. Thus, the access control system 202 is adapted to generate authorization determinations 416 potentially continually during one or more operational time periods based on recognition and anomalies determined by the HTM 320 on the basis of the SDR of records in the second log 410.

In accordance with embodiments of the present disclosure, when an anomaly is detected by the HTM 320 (indicating a recognition of a SDR record below a threshold degree of recognition), indicating unauthorized access/use by the consumer 206, the access control system 202 generates a new transaction to effect an expenditure of at least some part of the cryptocurrency allocated to the consumer 206. The new transaction is recorded in the blockchain 632, effected and verified by the network of miners 634. Thus, in this way, the cryptocurrency allocation of the consumer 206 is depleted by expenditure arising for unauthorized use/access by the consumer 206 of the restricted resource 298. Accordingly, while unauthorized use of the restricted resource 298 is tolerated, it can be limited by an amount of cryptocurrency allocated to the consumer 206 and a rate of expenditure of the cryptocurrency arising from determinations of unauthorized access/use by the HTM 320.

Where an amount of cryptocurrency allocated to the consumer 206 falls to a threshold level, then responsive action can be taken by the access control system 202 and/or the computer system 200 such as precluding access by the consumer 206 to the resource 298 and/or the computer system 200. In some embodiments, responsive action can be progressively increased as a level of cryptocurrency allocated to the consumer 206 decreases. For example: access to certain resources can be precluded such that resources in a set of authorized resources is reduced to a subset; characteristics of the resource or use of the resource can be changed, such as performance available to the consumer (speed, rate, throughput and the like) or an amount/volume of the resource available (e.g. an amount of storage); a class, standard or level of service provided by the resource 298 and/or computer system 200 can be adapted; and other such responsive actions as will be apparent to those skilled in the art.

Figure 7:
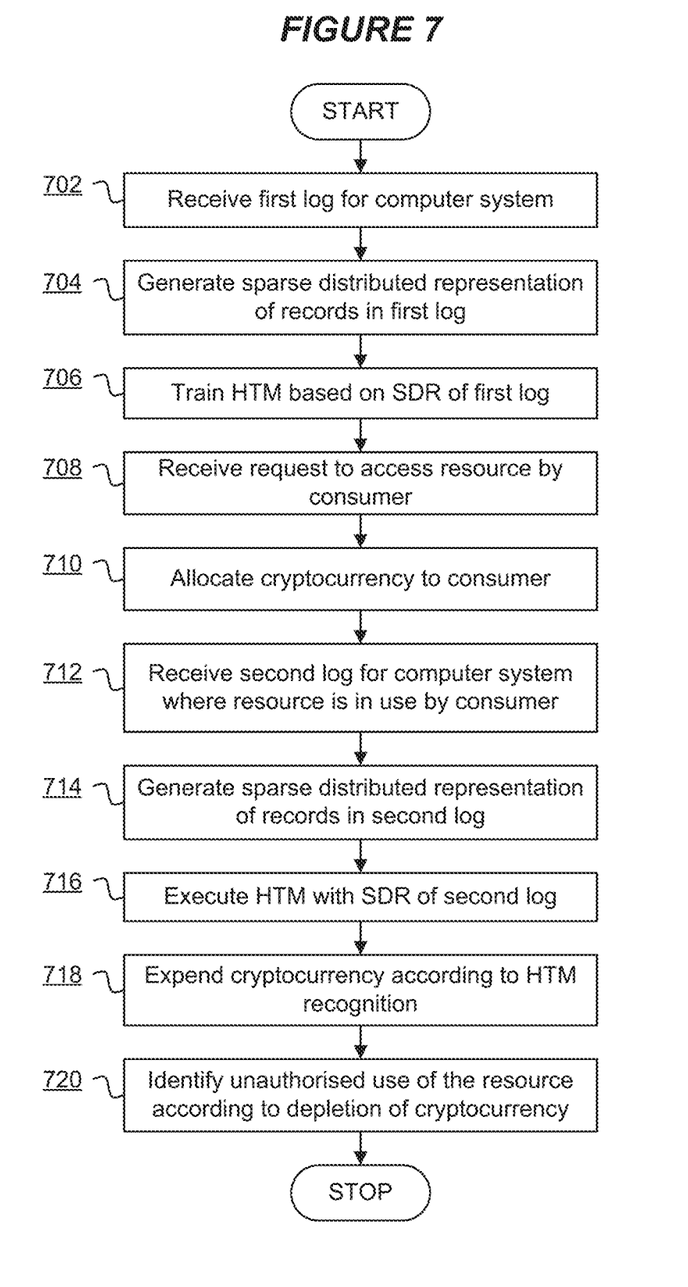
FIG. 7 is a flowchart of a method of access control for a restricted resource in accordance with embodiments of the present disclosure.

FIG. 7 is a flowchart of a method of access control for a restricted resource 298 in accordance with embodiments of the present disclosure. At 702, the access control system 202 receives the first log 310 as a first set of records for the operation of the computer system 200. Each record in the log details an occurrence in the computer system 200 during a training time period when the restricted resource 298 is accessed in an approved manner by the training consumer 306. At 704 an SDR 312 is generated for each of the records in the first log to form a training set for the HTM 320. At 706 the HTM 320 is trained based on the training set such that the trained HTM 320 provides a model of the operation of the computer system during the training time period. At 708 a request is received by the access control system 202 for access to the resource 298 by the consumer 206. At 710 the access control system 202 allocates a quantity of cryptocurrency to the consumer 206 by way of a blockchain transaction. At 712, the access control system 202 receives a second set of records for the computer system 200 as a second log 410. Each record in the second log 410 details an occurrence in the computer system 200 during an operational time period for the computer system 200 in use by a consumer 206 of the resource. At 714, an SDR is generated for each of the records in the second log 410 to form an input set for the trained HTM 320. At 716, the trained HTM 320 is executed based on the input set to determine a degree of recognition of the records of the input set by the HTM 320. At 718, the access control system 202 identifies unauthorized use of the resource 298 by the consumer 206 based on a degree of recognition by the HTM 320, where a degree of recognition below a predetermined threshold identifies an anomaly that indicates unauthorized use by the consumer 206. Where such unauthorized use is detected, the access control system 202 expends a quantity of cryptocurrency allocated to the consumer 206 by generating a new transaction for the blockchain. At 720, responsive actions/measures can be taken against unauthorized use by the consumer 206 according to the depletion of cryptocurrency allocated to the consumer 206.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for access control for a restricted resource in a computer system, the method comprising:

receiving a first set of records for the computer system, each record detailing an occurrence in the computer system during a training time period when the restricted resource is accessed in an approved manner;

generating a sparse distributed representation of the first set of records to form a training set for a hierarchical temporal memory (HTM);

training the HTM based on the training set in order that the trained HTM provides a model of operation of the computer system during the training time period;

receiving a request to access the restricted resource by a resource consumer;

allocating a predetermined quantity of cryptocurrency to the resource consumer, the allocation being recorded by a blockchain data structure accessible by a network, the blockchain data structure storing digitally signed records validated by network connected miner software components;

receiving a second set of records for the computer system, each record detailing an occurrence in the computer system during an operating time period for the computer system in use by the resource consumer of the restricted resource;

generating a sparse distributed representation of the second set of records to form an input set for the trained HTM;

executing the trained HTM based on the input set to determine a degree of recognition of the second set of records of the input set;

responsive to a determination that a degree of recognition of one or more records of the input set is below a threshold degree, generating a blockchain transaction to expend at least a portion of the cryptocurrency allocated to the resource consumer; and responsive to a determination that a quantity of cryptocurrency allocated to the resource consumer is below a threshold quantity, identifying the resource consumer as unauthorized to access the restricted resource.

2. The method of claim 1, further comprising precluding access to at least one of the computer system or the restricted resource in response to an identification that the resource consumer is unauthorized.

3. A computer system comprising:

a processor and a memory storing computer program code for performing:

receiving a first set of records for the computer system, each record detailing an occurrence in the computer system during a training time period when the restricted resource is accessed in an approved manner;

generating a sparse distributed representation of the first set of records to form a training set for a hierarchical temporal memory (HTM);

training the HTM based on the training set in order that the trained HTM provides a model of operation of the computer system during the training time period;

receiving a request to access the restricted resource by a resource consumer;

allocating a predetermined quantity of cryptocurrency to the resource consumer, the allocation being recorded by a blockchain data structure accessible by a network, the blockchain data structure storing digitally signed records validated by network connected miner software components;

receiving a second set of records for the computer system, each record detailing an occurrence in the computer system during an operating time period for the computer system in use by the resource consumer of the restricted resource;

generating a sparse distributed representation of the second set of records to form an input set for the trained HTM;

executing the trained HTM based on the input set to determine a degree of recognition of the second set of records of the input set;

responsive to a determination that a degree of recognition of one or more records of the input set is below a threshold degree, generating a blockchain transaction to expend at least a portion of the cryptocurrency allocated to the resource consumer; and responsive to a determination that a quantity of cryptocurrency allocated to the resource consumer is below a threshold quantity, identifying the resource consumer as unauthorized to access the restricted resource.

4. A non-transitory computer-readable storage medium storing a computer program element comprising computer program code to, when loaded into a computer system and executed thereon, cause the computer system to provide access control for a restricted resource in a computer system by:

receiving a first set of records for the computer system, each record detailing an occurrence in the computer system during a training time period when the restricted resource is accessed in an approved manner;

generating a sparse distributed representation of the first set of records to form a training set for a hierarchical temporal memory (HTM);

training the HTM based on the training set in order that the trained HTM provides a model of operation of the computer system during the training time period;

receiving a request to access the restricted resource by a resource consumer;

allocating a predetermined quantity of cryptocurrency to the resource consumer, the allocation being recorded by a blockchain data structure accessible by a network, the blockchain data structure storing digitally signed records validated by network connected miner software components;

receiving a second set of records for the computer system, each record detailing an occurrence in the computer system during an operating time period for the computer system in use by the resource consumer of the restricted resource;

generating a sparse distributed representation of the second set of records to form an input set for the trained HTM;

executing the trained HTM based on the input set to determine a degree of recognition of the second set of records of the input set;

responsive to a determination that a degree of recognition of one or more records of the input set is below a threshold degree, generating a blockchain transaction to expend at least a portion of the cryptocurrency allocated to the resource consumer; and responsive to a determination that a quantity of cryptocurrency allocated to the resource consumer is below a threshold quantity, identifying the resource consumer as unauthorized to access the restricted resource.

\* \* \* \* \*